United States Patent
Lin

(10) Patent No.: US 11,962,523 B2
(45) Date of Patent: Apr. 16, 2024

(54) METHOD AND APPARATUS FOR DETERMINING FREQUENCY HOPPING FOR A CHANNEL, AND COMPUTER STORAGE MEDIUM

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/645,874

(22) Filed: Dec. 23, 2021

(65) Prior Publication Data

US 2022/0116163 A1    Apr. 14, 2022

Related U.S. Application Data

(63) Continuation of application No. 16/776,186, filed on Jan. 29, 2020, now Pat. No. 11,245,500, which is a
(Continued)

(30) Foreign Application Priority Data

Sep. 8, 2017   (WO) ............... PCT/CN2017/101093
Apr. 20, 2018  (WO) ............... PCT/CN2018/083985
Jul. 24, 2018  (WO) ............... PCT/CN2018/096867

(51) Int. Cl.
*H04L 12/28*       (2006.01)
*H04L 5/00*        (2006.01)
(Continued)

(52) U.S. Cl.
CPC .......... *H04L 5/0012* (2013.01); *H04L 5/0094* (2013.01); *H04W 72/0453* (2013.01); *H04W 72/23* (2023.01)

(58) Field of Classification Search
CPC ..... H04B 1/713; H04B 1/7136; H04L 5/0012; H04W 72/0453; H04J 13/0074
(Continued)

(56) References Cited

U.S. PATENT DOCUMENTS 9,628,140 B2   4/2017  Xie et al.
9,887,801 B2   2/2018  Papasakellariou
(Continued)

FOREIGN PATENT DOCUMENTS

CN   1604509 A    4/2005
CN   101030801 A  9/2007
(Continued)

OTHER PUBLICATIONS

3GPP TSG RAN WG1 Meeting #90 R1-1713266, Guangdong OPPO Mobile Telecom, "Remaining issues on bandwidth part configuration and activation", Prague, Czech Republic, Aug. 21-25, 2017. 6 pages.
(Continued)

*Primary Examiner* — John Pezzlo
(74) *Attorney, Agent, or Firm* — Perkins Coie LLP

(57) ABSTRACT

This application discloses a method and an apparatus for determining frequency hopping for a channel, and a computer storage medium. The method includes: determining, by a terminal, a first bandwidth size corresponding to a bandwidth part, where the first bandwidth size corresponding to the bandwidth part is less than or equal to a bandwidth size of a carrier; determining, by the terminal based on the first bandwidth size corresponding to the bandwidth part, a frequency hopping step-size corresponding to an uplink
(Continued)

A terminal determines a first bandwidth size corresponding to a bandwidth part — 301

The terminal determines, based on the first bandwidth size corresponding to the bandwidth part, a frequency hopping step-size corresponding to an uplink channel — 302

The terminal determines, based on the frequency hopping step-size corresponding to the uplink channel, a frequency domain position used for transmitting the uplink channel — 303 channel; and determining, by the terminal based on the frequency hopping step-size corresponding to the uplink channel, a frequency domain position used for transmitting the uplink channel.

20 Claims, 8 Drawing Sheets

Related U.S. Application Data continuation of application No. PCT/CN2018/097114, filed on Jul. 25, 2018.

(51) Int. Cl.
  *H04W 72/0453* (2023.01)
  *H04W 72/23* (2023.01)
  *H04J 1/16* (2006.01)
(58) Field of Classification Search
  USPC .................................... 370/252, 329, 430
  See application file for complete search history.

(56) References Cited

U.S. PATENT DOCUMENTS

| | | |
|---|---|---|
| 2010/0284363 A1 | 11/2010 | Ahn |
| 2012/0263142 A1 | 10/2012 | Ahn |
| 2012/0307744 A1* | 12/2012 | Charbit ................. H04W 72/12 370/329 |
| 2014/0198745 A1 | 7/2014 | Fei |
| 2014/0321510 A1 | 10/2014 | Ahn et al. |
| 2016/0269939 A1 | 9/2016 | Papasakellariou |
| 2016/0277065 A1 | 9/2016 | Xie et al. |
| 2016/0345118 A1 | 11/2016 | Oh |
| 2017/0134068 A1 | 5/2017 | Ahn et al. |
| 2017/0238313 A1 | 8/2017 | Wang et al. |
| 2017/0295005 A1 | 10/2017 | Lee et al. |
| 2017/0346615 A1 | 11/2017 | Liu |
| 2018/0159655 A1 | 6/2018 | Papasakellariou |
| 2018/0159656 A1 | 6/2018 | Papasakellariou |
| 2018/0288746 A1* | 10/2018 | Zhang ................... H04L 1/0031 |
| 2019/0174283 A1 | 6/2019 | Awad |
| 2020/0022127 A1 | 1/2020 | Li et al. |
| 2020/0059390 A1 | 2/2020 | Zhang et al. |
| 2020/0084776 A1 | 3/2020 | Zhang |
| 2020/0120642 A1 | 4/2020 | Hwang et al. |
| 2020/0244421 A1 | 7/2020 | Lee et al. |
| 2020/0344761 A1 | 10/2020 | Amuru et al. |

FOREIGN PATENT DOCUMENTS

| | | |
|---|---|---|
| CN | 101400065 A | 4/2009 |
| CN | 101815325 A | 8/2010 |
| CN | 101816133 A | 8/2010 |
| CN | 102781110 A | 11/2012 |
| CN | 103517344 A | 1/2014 |
| CN | 104283581 A | 1/2015 |
| CN | 106160988 A | 11/2016 |
| CN | 106464296 A | 2/2017 |
| KR | 20170042695 A | 4/2017 |
| RU | 2531386 C2 | 10/2014 |
| WO | 2016025836 A1 | 12/2016 |

OTHER PUBLICATIONS

Corrected Notice of Allowability dated Feb. 15, 2022 of U.S. Appl. No. 16/802,460, filed Feb. 26, 2020. 2 pages.
Corrected Notice of Allowability dated Mar. 25, 2022 of U.S. Appl. No. 16/802,460, filed Feb. 26, 2020. 3 pages.
First Office Action of the Japanese application No. 2020-513921, dated Feb. 25, 2022. 12 pages with English translation.
First Office Action of the Korean application No. 10-2020-7009982, dated Mar. 16, 2022. 9 pages with English translation.
Notice of Allowance dated Dec. 8, 2021 of U.S. Appl. No. 16/802,460, filed Feb. 26, 2020. 12 pages.
Notice of Allowance of the Chinese application No. 202010107956.7, dated Aug. 25, 2021.
Pre-Interview Communication of the U.S. Appl. No. 16/802,460, dated Jul. 21, 2021.
Office Action of the Indian application No. 202017014767, dated Sep. 23, 2021.
Office Action of the Taiwanese application No. 107131637, dated Sep. 30, 2021.
Office Action of the Taiwanese application No. 107131634, dated Sep. 30, 2021.
European Patent Application No. 18854548.7, European search report dated Jul. 27, 2020.
R2-1702318 Apple Intelqualcomm,Etc, Signaling support for CE mode and bandwidth switch for FeMTC devices Feb. 13-17, 2017.
R1-1710782 CMCC Discussion on subband-based PUCCH resource allocation and indication Jun. 27-30, 2017.
R2-1706427 Samsung, RAN2 consideration for bandwidth part in NR Jun. 27-29, 2017.
R1-1712402 CATT Design of 2-symbol short PUCCHformat Aug. 21-25, 2017.
R1-1712870 VIVO Discussion on the activation/deactivation of the bandwidth part Aug. 21-25, 2017.
European Patent Application No. 18853277.4—European search report dated Jul. 27, 2020.
International search report, PCT/CN2017/101093, dated Nov. 29, 2017.
International search report, PCT/CN2018/083985, dated Jul. 20, 2018.
International search report, PCT/CN2018/097114, dated Sep. 27, 2018.
Samsung, "Bandwidth Part Hopping for Coresets" 3GPP TSG RAN WG1 NR ad-Hoc#2, R1-1710702, Jun. 30, 2017.
Samsung. DL/UL Frequency Resource Allocation. 3GPP TSG RAN WGI Meeting NR Ad-Hoc, R1-1710718, Qingdao, China, Jun. 27-30 section 3.
Samsung. Bandwidth Part Hopping for Coresets, R1-1713621. 3GPP TSG RAN WG1 #90, Prague, Czech Republic. Aug. 25, 2017 (Aug. 25, 2017), sections 1 and 2.
KT Corp. Considerations on Frequency Hopping for PUCCH, R1-1714475. 3GPP TSG RAN WG1 Meeting #90 Prague, Czechia. Aug. 25, 2017 (Aug. 25, 2017), sections 1 and 2.
Supplementary European Search Report in the European application No. 22165945.1, dated Sep. 21, 2022. 12 pages.
Office Action of the Australian application No. 2018328888, dated Oct. 31, 2022. 3 pages.
Supplementary European Search Report in the European application No. 22165995.6, dated Jul. 19, 2022. 14 pages.
First Office Action of the Chinese application No. 202010107956.7, dated Apr. 21, 2021.
First Office Action of the Canadian application No. 3074337, dated Apr. 20, 2021.
First Office Action of the European application No. 18853277.4, dated Apr. 30, 2021.
First Office Action of the European application No. 18854548.7, dated May 6, 2021.
Written Opinion of the Singaporean application No. 11202001883V, dated Oct. 22, 2021.
Office Action of the Indian application No. 202017014770, dated May 22, 2021.
First Office Action of the Russian application No. 2020112737, dated Nov. 9, 2021.
First Office Action of the U.S. Appl. No. 16/776,186, dated Jun. 29, 2021.
Notice of Allowance of the U.S. Appl. No. 16/776,186, dated Sep. 23, 2021.
Supplementary Notice of Allowance of the U.S. Appl. No. 16/776,186, dated Nov. 5, 2021.
First Office Action of the Chinese application No. 202010087344.6, dated Mar. 31, 2021.

(56) References Cited

OTHER PUBLICATIONS

MCC Support "Final Report of 3GPP TSG RAN WG1 #90 v1.0.0 (Prague, Czech Rep, Aug. 21-25, 2017)" 3GPP TSG RAN WG1 Meeting #90bis R1-1716941, Prague, Czech Rep, Oct. 9-13, 2017.
English translation of the Written Opinion of the International Search Authority in the international application No. PCT/CN2018/097114, dated Sep. 27, 2018.
English translation of the Written Opinion of the International Search Authority in the international application No. PCT/CN2017/101093, dated Nov. 29, 2017.
English translation of the Written Opinion of the International Search Authority in the international application No. PCT/CN2018/083985, dated Jul. 20, 2018.
First Office Action of the Mexican application No. MX/a/2020/002541, dated Jul. 13, 2023. 6 pages with English translation.
First Office Action of the U.S. Appl. No. 17/652,889, dated Sep. 6, 2023. 30 pages.
Final Office Action of the U.S. Appl. No. 17/652,889, issued on Feb. 1, 2024. 30 pages.

\* cited by examiner

METHOD AND APPARATUS FOR DETERMINING FREQUENCY HOPPING FOR A CHANNEL, AND COMPUTER STORAGE MEDIUM

CROSS-REFERENCES TO RELATED APPLICATIONS

This application is a continuation of U.S. patent application Ser. No. 16/776,186 filed on Jan. 29, 2021, which is a continuation of International Patent Application PCT/CN2018/097114 filed on Jul. 25, 2018, which claims priority to International Patent Applications PCT/CN2017/101093 filed on Sep. 8, 2017, PCT/CN2018/083985 filed on Apr. 20, 2018, and PCT/CN2018/096867 filed on Jul. 24, 2018. The contents of these applications are hereby incorporated by reference in their entirety.

BACKGROUND

Technical Field

This application relates to frequency hopping technologies in the mobile communications field, and in particular, to a method and an apparatus for determining frequency hopping for a channel, and a computer storage medium.

Related Art

In a long term evolution (LTE, Long Term Evolution) system, a frequency hopping technology may be used for a physical uplink control channel (PUCCH, Physical Uplink Control CHannel), to obtain a frequency domain diversity gain, and improve channel transmission performance. In LTE, the first step and the second step of PUCCH frequency hopping are symmetrical about central axis of system bandwidth. As shown in FIG. 1, a distance between the first step and a lower edge of the system bandwidth is kept to be consistent with a distance D between the second step and an upper edge of the system bandwidth, where both distances are D.

In the foregoing design for the PUCCH frequency hopping, PUCCHs may be distributed on two sides of the system bandwidth, so that a central part of the system bandwidth is left to a data channel, such as a physical uplink shared channel (PUSCH, Physical Uplink Shared Channel), but causing PUCCH frequency hopping step-sizes of different terminals to be different. As shown in FIG. 2, for some terminals, frequency hopping step-sizes are larger, and PUCCHs are closer to an edge of the system bandwidth, a frequency domain diversity effect is better, and transmission performance is better; and for some other terminals, frequency hopping step-sizes are smaller, PUCCHs are closer to a center of the system bandwidth, a frequency domain diversity effect is poorer, and transmission performance is worse. It can be seen that a conventional design for the PUCCH frequency hopping causes an unstable frequency hopping step-size, leading to the decline of transmission performance of the PUCCH of part of terminals when a capacity of the PUCCH is relatively large.

SUMMARY

Embodiments of this application provide a method and an apparatus for determining frequency hopping for a channel, and a computer storage medium, to resolve a problem that PUCCH transmission performance is reduced.

A method for determining frequency hopping for a channel provided according to an embodiment of this application includes: determining, by a terminal, a first bandwidth size corresponding to a bandwidth part, where the first bandwidth size corresponding to the bandwidth part is less than or equal to a bandwidth size of a carrier; determining, by the terminal based on the first bandwidth size corresponding to the bandwidth part, a frequency hopping step-size corresponding to an uplink channel; and determining, by the terminal based on the frequency hopping step-size corresponding to the uplink channel, a frequency domain position used for transmitting the uplink channel.

In an embodiment of this application, the determining, by a terminal, a first bandwidth size corresponding to a bandwidth part includes: receiving, by the terminal, first configuration information, and determining, based on the first configuration information, the first bandwidth size corresponding to the bandwidth part.

In an embodiment of this application, the receiving, by the terminal, first configuration information includes: receiving, by the terminal, radio resource control (RRC, Radio Resource Control) signaling that carries the first configuration information; or receiving, by the terminal, system information that carries the first configuration information.

In an embodiment of this application, the receiving, by the terminal, first configuration information, and determining, based on the first configuration information, the first bandwidth size corresponding to the bandwidth part includes: determining, by the terminal based on one piece of first configuration information when receiving the one piece of first configuration information, the first bandwidth size corresponding to the bandwidth part; and determining, by the terminal based on a plurality of pieces of first configuration information when receiving the plurality of pieces of first configuration information, a plurality of candidate first bandwidth sizes corresponding to the bandwidth part; and selecting, from the plurality of candidate first bandwidth sizes, the first bandwidth size corresponding to the bandwidth part.

In an embodiment of this application, the selecting, from the plurality of candidate first bandwidth sizes, a first bandwidth size corresponding to the bandwidth part includes: receiving, by the terminal, first control signaling, and selecting, from the plurality of candidate first bandwidth sizes based on the first control signaling, the first bandwidth size corresponding to the bandwidth part.

In an embodiment of this application, the first control signaling is: downlink control information (DCI, Downlink Control Information) or a media access control element (MAC CE, Media Access Control Control Element).

In an embodiment of this application, the determining, by the terminal based on the first bandwidth size corresponding to the bandwidth part, a frequency hopping step-size corresponding to an uplink channel includes: determining, by the terminal based on the following formula, the frequency hopping step-size corresponding to the uplink channel: $W_H = nW$, where $W_H$ is the frequency hopping step-size corresponding to the uplink channel, W is the first bandwidth size corresponding to the bandwidth part, n is a scale factor, $n = 1/m$, and m is a positive integer greater than 1.

In an embodiment of this application, m=2 or 4.

In an embodiment of this application, when $W_H$ is determined based on the formula $W_H = nW$, $W_H = \lceil nW \rceil$ or $\lfloor nW \rfloor$, where $\lceil nW \rceil$ represents a minimum integer greater than nW, and $\lfloor nW \rfloor$ represents a maximum integer less than nW.

Considering that the frequency hopping step-size has an actual meaning only when being equal to an integer multiple of a frequency domain scheduling unit, in this embodiment of this application, a value of $W_H$ is an integer.

In an embodiment of this application, the method further includes: determining, by the terminal, n or $W_H$ based on a preset value; or receiving, by the terminal, second configuration information, and determining n or $W_H$ based on the second configuration information.

In an embodiment of this application, the receiving, by the terminal, second configuration information includes: receiving, by the terminal, RRC signaling that carries the second configuration information; or receiving, by the terminal, system information that carries the second configuration information.

In an embodiment of this application, the second configuration information and the first configuration information are same configuration information.

In an embodiment of this application, the receiving, by the terminal, second configuration information, and determining n or $W_H$ based on the second configuration information includes: determining, by the terminal, n or $W_H$ based on one piece of second configuration information when receiving the one piece of second configuration information; and determining, by the terminal, a plurality of candidate n or $W_H$ based on a plurality of pieces of second configuration information when receiving the plurality of pieces of second configuration information; and selecting n or $W_H$ from the plurality of candidate n or $W_H$.

In an embodiment of this application, the selecting n or $W_H$ from the plurality of candidate n or $W_H$ includes: receiving, by the terminal, second control signaling, and selecting n or $W_H$ from the plurality of candidate n or $W_H$ based on the second control signaling.

In an embodiment of this application, the second control signaling is: DCI or a MAC CE.

In an embodiment of this application, the second control signaling and the first control signaling are same control signaling.

In an embodiment of this application, the determining, by the terminal based on the frequency hopping step-size corresponding to the uplink channel, a frequency domain position used for transmitting the uplink channel includes: determining, by the terminal, a frequency domain position of the second step of frequency hopping based on a frequency domain position of the first step of frequency hopping and the frequency hopping step-size corresponding to the uplink channel, where the frequency domain position of the first step of frequency hopping and the frequency domain position of the second step of frequency hopping are frequency domain positions used for transmitting the uplink channel.

In an embodiment of this application, the method further includes: receiving, by the terminal, third control signaling, and determining the frequency domain position of the first step of frequency hopping based on the third control signaling.

In an embodiment of this application, the third control signaling is: DCI or a MAC CE.

In an embodiment of this application, the third control signaling and at least one of the following are same control signaling: the first control signaling and the second control signaling.

An apparatus for determining frequency hopping for a channel provided according to an embodiment of this application includes: a first determining unit, configured to determine a first bandwidth size corresponding to a bandwidth part, where the first bandwidth size corresponding to the bandwidth part is less than or equal to a bandwidth size of a carrier; a second determining unit, configured to determine, based on the first bandwidth size corresponding to the bandwidth part, a frequency hopping step-size corresponding to an uplink channel; and a third determining unit, configured to determine, based on the frequency hopping step-size corresponding to the uplink channel, a frequency domain position used for transmitting the uplink channel.

In an embodiment of this application, the first determining unit includes: a first receiving subunit, configured to receive first configuration information; and a first determining subunit, configured to determine, based on the first configuration information, the first bandwidth size corresponding to the bandwidth part.

In an embodiment of this application, the first receiving subunit is specifically configured to receive RRC signaling that carries the first configuration information; or receive system information that carries the first configuration information.

In an embodiment of this application, the first determining subunit is specifically configured to: determine, based on one piece of first configuration information when the one piece of first configuration information is received, the first bandwidth size corresponding to the bandwidth part; determine, based on a plurality of pieces of first configuration information when the plurality of pieces of first configuration information is received, a plurality of candidate first bandwidth sizes corresponding to the bandwidth part; and select, from the plurality of candidate first bandwidth sizes, a first bandwidth size corresponding to the bandwidth part.

In an embodiment of this application, the first determining unit further includes: a second receiving subunit, configured to receive first control signaling; and the first determining subunit is further configured to select, from the plurality of candidate first bandwidth sizes based on the first control signaling, the first bandwidth size corresponding to the bandwidth part.

In an embodiment of this application, the first control signaling is: DCI or a MAC CE.

In an embodiment of this application, the second determining unit is specifically configured to determine, based on the following formula, the frequency hopping step-size corresponding to the uplink channel: $W_H = nW$, where $W_H$ is the frequency hopping step-size corresponding to the uplink channel, W is the first bandwidth size corresponding to the bandwidth part, n is a scale factor, n=1/m, and m is a positive integer greater than 1.

In an embodiment of this application, m=2 or 4.

In an embodiment of this application, when $W_H$ is determined based on the formula $W_H = nW$, $W_H = \lceil nW \rceil$ or $\lfloor nW \rfloor$, where $\lceil nW \rceil$ represents a minimum integer greater than nW, and $\lfloor nW \rfloor$ represents a maximum integer less than nW.

Considering that the frequency hopping step-size has an actual meaning only when being equal to an integer multiple of a frequency domain scheduling unit, in this embodiment of this application, a value of $W_H$ is an integer.

In an embodiment of this application, the second determining unit includes: a second determining subunit, configured to determine n or $W_H$ based on a preset value; or a third receiving subunit, configured to receive second configuration information; and a second determining subunit, configured to determine n or $W_H$ based on the second configuration information.

In an embodiment of this application, the third receiving subunit is specifically configured to receive RRC signaling that carries the second configuration information; or receive system information that carries the second configuration information.

In an embodiment of this application, the second configuration information and the first configuration information are same configuration information.

In an embodiment of this application, the second determining subunit is specifically configured to: determine n or $W_H$ based on one piece of second configuration information when the one piece of second configuration information is received; determine a plurality of candidate n or $W_H$ based on a plurality of pieces of second configuration information when the plurality of pieces of second configuration information is received; and select n or $W_H$ from the plurality of candidate n or $W_H$.

In an embodiment of this application, the second determining unit further includes: a fourth receiving subunit, configured to receive second control signaling; and the second determining subunit is further configured to select n or $W_H$ from the plurality of candidate n or $W_H$ based on the second control signaling.

In an embodiment of this application, the second control signaling is: DCI or a MAC CE.

In an embodiment of this application, the second control signaling and the first control signaling are same control signaling.

In an embodiment of this application, the third determining unit is specifically configured to determine a frequency domain position of the second step of frequency hopping based on a frequency domain position of the first step of frequency hopping and the frequency hopping step-size corresponding to the uplink channel, where the frequency domain position of the first step of frequency hopping and the frequency domain position of the second step of frequency hopping are frequency domain positions used for transmitting the uplink channel.

In an embodiment of this application, the third determining unit includes: a fifth receiving subunit, configured to receive third control signaling; and a third determining subunit, configured to determine the frequency domain position of the first step of frequency hopping based on the third control signaling.

In an embodiment of this application, the third control signaling is: DCI or a MAC CE.

In an embodiment of this application, the third control signaling and at least one of the following are same control signaling: the first control signaling and the second control signaling.

A computer storage medium provided according to an embodiment of this application stores a computer executable instruction. The computer executable instruction is executed by a processor to implement the foregoing method for determining frequency hopping for a channel.

In the technical solutions of the embodiments of this application, the terminal determines the first bandwidth size corresponding to the bandwidth part, where the first bandwidth size corresponding to the bandwidth part is less than or equal to the bandwidth size of the carrier; the terminal determines, based on the first bandwidth size corresponding to the bandwidth part, the frequency hopping step-size corresponding to the uplink channel; and the terminal determines, based on the frequency hopping step-size corresponding to the uplink channel, the frequency domain position used for transmitting the uplink channel. When the technical solutions of the embodiments of this application are used, a stable frequency hopping step-size is implemented when the bandwidth size of the bandwidth part is given, thereby obtaining a more stable frequency domain diversity gain, and improving uplink channel (particularly uplink control channel) transmission performance.

BRIEF DESCRIPTION OF THE DRAWINGS

The accompanying drawings described herein are used for providing further understanding for this application and constitute a part of this application. Examples of embodiments of this application and descriptions thereof are used for explaining this application and do not constitute an improper limitation to this application. In the figures.

DETAILED DESCRIPTION

To enable characteristics and technical content of embodiments of this application to be understood in a more detailed manner, the following describes implementation of the embodiments of this application in detail with reference to the accompanying drawings. The appended accompanying drawings are only for reference and description, and are not used to limit the embodiments of this application.

The 5th generation mobile communication (5G NR) system is a direction of future mobile communication system research. In the 5G NR system, on one hand, to increase flexibility of frequency domain resource allocation, and reduce terminal power consumption, a 5G NR terminal may transmit a signal in a bandwidth part (Bandwidth Part) less than system bandwidth. When bandwidth of the bandwidth part is relatively small, a frequency hopping step-size of a central PUCCH is further reduced, affecting PUCCH transmission performance. On the other hand, a series of new technologies, such as a new-type multiple-input multiple-output (MIMO, Multiple-Input Multiple-Output) technology, are introduced into 5G NR, a larger quantity of channel state information reports (CSI report) are needed, and PUCCH load is increased by a big margin. Consequently, this causes a PUCCH to occupy a larger proportion of frequency domain resources in the bandwidth part, a frequency hopping step-size of a PUCCH close to a center of the bandwidth part becomes smaller, and the transmission performance further deteriorates.

Therefore, an embodiment of this application provides a method for determining frequency hopping for a channel, to implement a stable frequency hopping step-size when a bandwidth size of the bandwidth part is given, thereby obtaining a more stable frequency domain diversity gain, and improving uplink channel (particularly uplink control channel) transmission performance.

Figure 1:
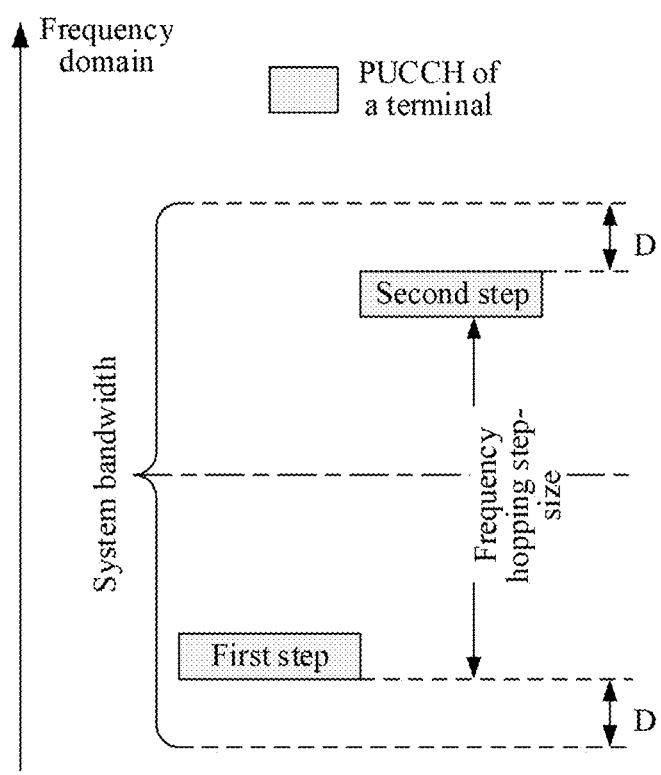
FIG. 1 is a schematic diagram 1 of an existing PUCCH frequency domain structure.
Figure 2:
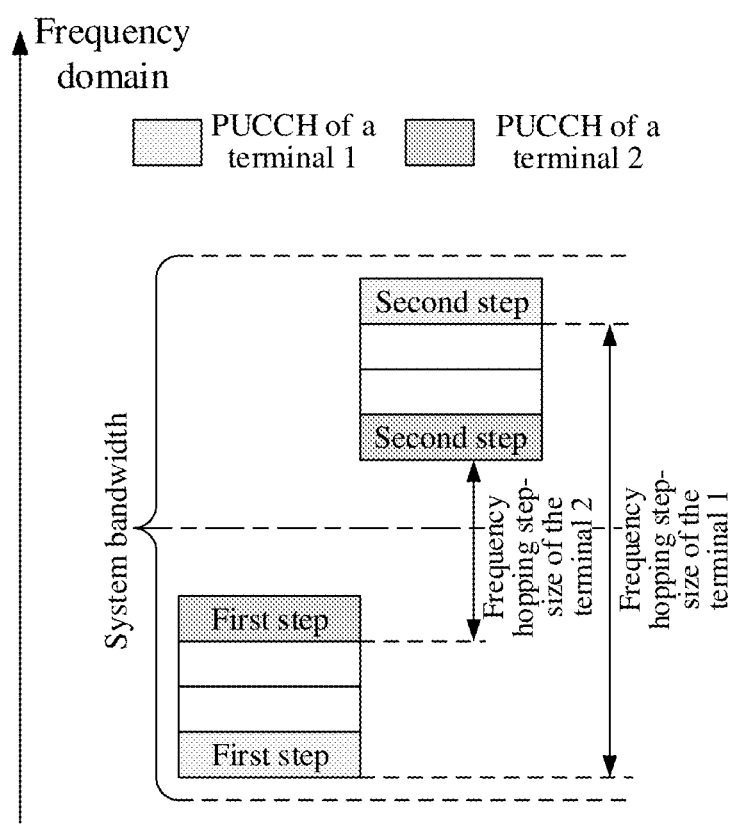
FIG. 2 is a schematic diagram 2 of an existing PUCCH frequency domain structure.
Figure 3:
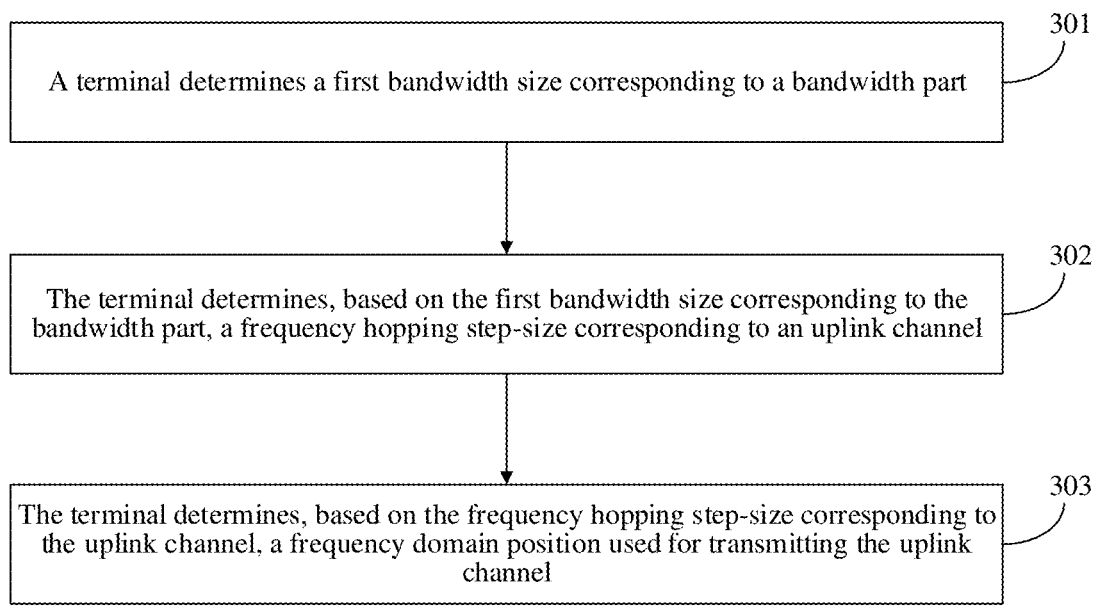
FIG. 3 is a schematic flowchart of a method for determining frequency hopping for a channel according to an embodiment of this application.

FIG. 3 is a schematic flowchart of a method for determining frequency hopping for a channel according to an embodiment of this application. As shown in FIG. 3, the method for determining frequency hopping for a channel includes the following steps.

Step 301: A terminal determines a first bandwidth size corresponding to a bandwidth part, where the first bandwidth size corresponding to the bandwidth part is less than or equal to a bandwidth size of a carrier.

In this embodiment of this application, a type of the terminal is not limited. The terminal may be any type, such as a mobile phone, a notebook computer, a tablet computer, a desktop computer, an in-vehicle terminal, or a smart home terminal.

In this embodiment of this application, bandwidth supported by a base station is referred to as system bandwidth. In LTE, the terminal may transmit a signal in an entire system bandwidth range. In a 5G NR system, the terminal transmits a signal only in a part of the system bandwidth. Herein, the part of the system bandwidth is referred to as the bandwidth part. Resource utilization efficiency of the system bandwidth can be effectively improved by using the bandwidth part.

In this embodiment of this application, an uplink channel may be transmitted in a frequency hopping manner. Using an example in which frequency hopping includes two steps, a difference in frequency domain between the first step of frequency hopping and the second step of frequency hopping is a frequency hopping step-size. A size of the frequency hopping step-size determines a frequency domain diversity gain of the uplink channel. A larger frequency hopping step-size indicates a larger frequency domain diversity gain of the uplink channel. On the contrary, a smaller frequency hopping step-size indicates a smaller frequency domain diversity gain of the uplink channel. To obtain a stable and relatively large frequency domain diversity gain, in this embodiment of this application, the frequency hopping step-size corresponding to the uplink channel is determined based on the first bandwidth size corresponding to the bandwidth part, to improve uplink channel (particularly uplink control channel) transmission performance.

Specifically, the terminal needs to first determine the first bandwidth size corresponding to the bandwidth part. Apparently, the first bandwidth size corresponding to the bandwidth part is less than or equal to the bandwidth size of the carrier.

In an embodiment of this application, the terminal receives first configuration information, and determines, based on the first configuration information, the first bandwidth size corresponding to the bandwidth part.

Herein, that the terminal receives first configuration information may be implemented in the following two manners:
Manner 1: The terminal receives RRC signaling that carries the first configuration information.
Manner 2: The terminal receives system information that carries the first configuration information.

In the foregoing solution, the terminal may receive one or more pieces of first configuration information. Herein, a meaning of more is being greater than or equal to two.

The terminal determines, based on one piece of first configuration information when receiving the one piece of first configuration information, the first bandwidth size corresponding to the bandwidth part.

The terminal determines, based on a plurality of pieces of first configuration information when receiving the plurality of pieces of first configuration information, a plurality of candidate first bandwidth sizes corresponding to the bandwidth part; and selects, from the plurality of candidate first bandwidth sizes, the first bandwidth size corresponding to the bandwidth part.

Herein, the terminal receives first control signaling, and selects, from the plurality of candidate first bandwidth sizes based on the first control signaling, the first bandwidth size corresponding to the bandwidth part. The first control signaling is: DCI or a MAC CE.

Step 302: The terminal determines, based on the first bandwidth size corresponding to the bandwidth part, a frequency hopping step-size corresponding to an uplink channel.

In this embodiment of this application, the terminal determines, based on the following formula, the frequency hopping step-size corresponding to the uplink channel: $W_H = nW$, where $W_H$ is the frequency hopping step-size corresponding to the uplink channel, W is the first bandwidth size corresponding to the bandwidth part, n is a scale factor, n=1/m, and m is a positive integer greater than 1.

In an implementation, m=2 or 4.

In an embodiment of this application, when $W_H$ is determined based on the formula $W_H = nW$, $W_H = \lceil nW \rceil$ or $\lfloor nW \rfloor$, where $\lceil nW \rceil$ represents a minimum integer greater than nW, and $\lfloor nW \rfloor$ represents a maximum integer less than nW.

Considering that the frequency hopping step-size has an actual meaning only when being equal to an integer multiple of a frequency domain scheduling unit, in this embodiment of this application, a value of $W_H$ is an integer.

For example, n may be ½, ¼, or the like, and different terminals may correspond to a same n value, or different terminals correspond to different n values.

In the foregoing solution, the terminal needs to first determine n or $W_H$. Specifically, the terminal determines n or $W_H$ based on a preset value; or the terminal receives second configuration information, and determines n or $W_H$ based on the second configuration information.

Herein, that the terminal receives second configuration information may be implemented in the following two manners:
Manner 1: The terminal receives RRC signaling that carries the second configuration information.
Manner 2: The terminal receives system information that carries the second configuration information.

In an implementation of this application, the second configuration information and the first configuration information are same configuration information.

In the foregoing solution, the terminal may receive one or more pieces of second configuration information.

The terminal determines n or $W_H$ based on one piece of second configuration information when receiving the one piece of second configuration information.

The terminal determines a plurality of candidate n or $W_H$ based on a plurality of pieces of second configuration information when receiving the plurality of pieces of second configuration information; and selects n or $W_H$ from the plurality of candidate n or $W_H$.

Herein, the terminal receives second control signaling, and selects n or $W_H$ from the plurality of candidate n or $W_H$ based on the second control signaling. The second control signaling is: DCI or a MAC CE.

In an implementation of this application, the second control signaling and the first control signaling are same control signaling.

Step 303: The terminal determines, based on the frequency hopping step-size corresponding to the uplink channel, a frequency domain position used for transmitting the uplink channel.

In this embodiment of this application, the terminal determines a frequency domain position of the second step of frequency hopping based on a frequency domain position of the first step of frequency hopping and the frequency hopping step-size corresponding to the uplink channel, where the frequency domain position of the first step of frequency hopping and the frequency domain position of the second step of frequency hopping are frequency domain positions used for transmitting the uplink channel.

Herein, the terminal receives third control signaling, and determines the frequency domain position of the first step of frequency hopping based on the third control signaling. The third control signaling is: DCI or a MAC CE.

In an embodiment of this application, the third control signaling and at least one of the following are same control signaling: the first control signaling and the second control signaling.

The following further describes the technical solutions in the embodiments of this application in detail with reference to specific application examples.

APPLICATION EXAMPLE 1

In this example, for a PUCCH frequency domain, a uniform frequency hopping step-size is used in one bandwidth part.

Figure 4:
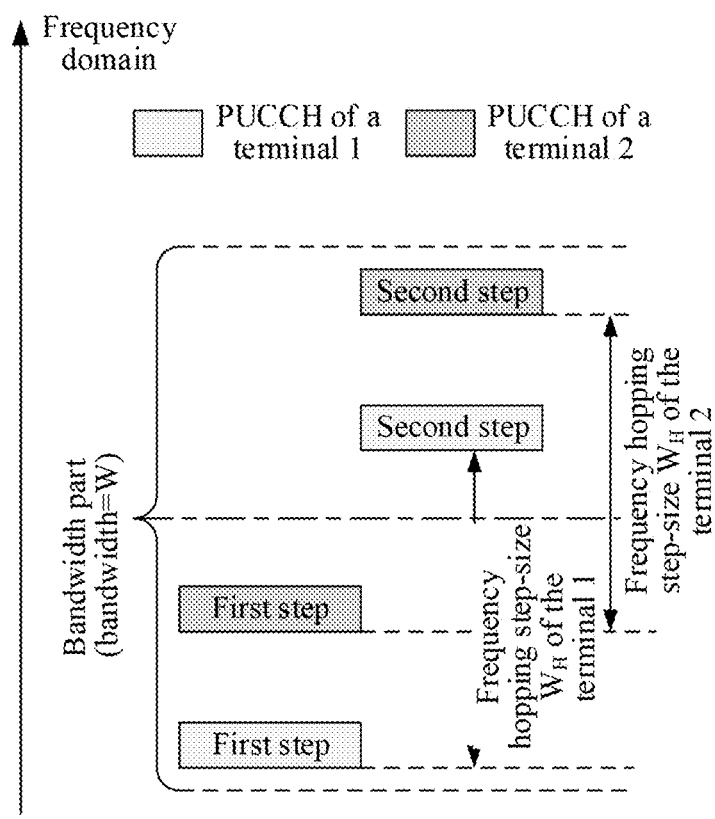
FIG. 4 is a schematic diagram 1 of a PUCCH frequency domain structure according to an embodiment of this application.

FIG. 4 is a schematic diagram 1 of a PUCCH frequency domain structure according to an embodiment of this application. As shown in FIG. 4, a bandwidth size of a bandwidth part or a type of bandwidth part is W, and a frequency hopping step-size $W_H$ in the PUCCH frequency domain corresponds to the bandwidth size W of the bandwidth part. For example, $W_H$=W/2.

In an implementation, a plurality of terminals that use a same bandwidth part use same $W_H$. For example, a bandwidth size of a bandwidth part 1 is W1, and a bandwidth size of a bandwidth part 2 is W2. In this case, a plurality of terminals in the bandwidth part 1 use same $W_H$=W1/2, and a plurality of terminals in the bandwidth part 2 use same $W_H$=W2/2.

In another implementation, a plurality of terminals that use bandwidth parts of a same value use same $W_H$. For example, bandwidth sizes of the bandwidth part 1 and the bandwidth part 2 are both W. In this case, a plurality of terminals in bandwidth part 1 and the bandwidth part 2 all use same $W_H$=W/2.

APPLICATION EXAMPLE 2

In this example, for a PUCCH frequency domain, a plurality of frequency hopping step-sizes are used in one bandwidth part.

Figure 5:
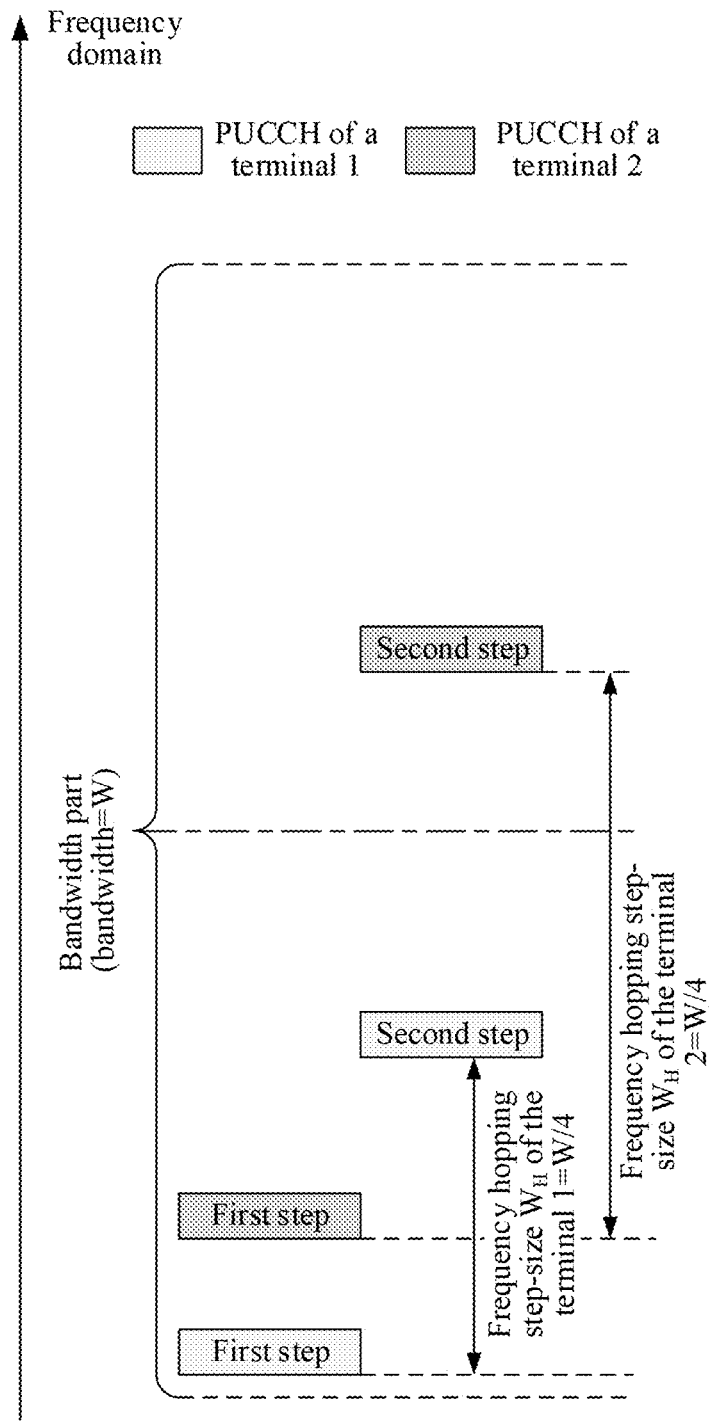
FIG. 5 is a schematic diagram 2 of a PUCCH frequency domain structure according to an embodiment of this application.

FIG. 5 is a schematic diagram 2 of a PUCCH frequency domain structure according to an embodiment of this application. As shown in FIG. 5, a bandwidth size of a bandwidth part or a type of bandwidth part is W, and a frequency hopping step-size $W_H$ in the PUCCH frequency domain corresponds to the bandwidth size W of the bandwidth part. A plurality of terminals that use a same bandwidth part or bandwidth parts of a same value may use different $W_H$ configurations. For example, $W_H$ of a terminal 1=W/4, and $W_H$ of a terminal 2=W/2. In other words, the terminal 1 and the terminal 2 use different n configurations, that is, n of the terminal 1=4, and n of the terminal 2=2.

Figure 6:
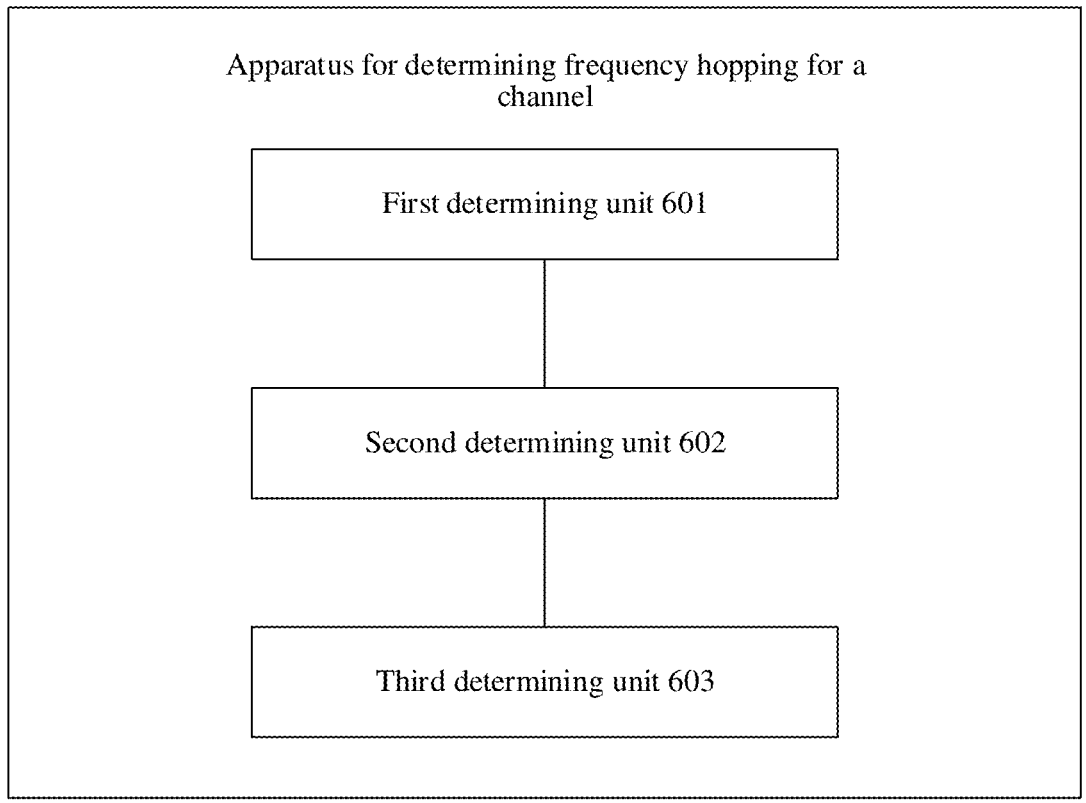
FIG. 6 is a schematic structural composition diagram 1 of an apparatus for determining frequency hopping for a channel according to an embodiment of this application.

FIG. 6 is a schematic structural composition diagram 1 of an apparatus for determining frequency hopping for a channel according to an embodiment of this application. As shown in FIG. 6, the apparatus for determining frequency hopping for a channel includes: a first determining unit 601, configured to determine a first bandwidth size corresponding to a bandwidth part, where the first bandwidth size corresponding to the bandwidth part is less than or equal to a bandwidth size of a carrier; a second determining unit 602, configured to determine, based on the first bandwidth size corresponding to the bandwidth part, a frequency hopping step-size corresponding to an uplink channel; and a third determining unit 603, configured to determine, based on the frequency hopping step-size corresponding to the uplink channel, a frequency domain position used for transmitting the uplink channel.

Persons skilled in the art should understand that, functions implemented by units in the apparatus for determining frequency hopping for a channel shown in FIG. 6 may be understood by referring to the related description of the foregoing method for determining frequency hopping for a channel. The functions of the units in the apparatus for determining frequency hopping for a channel shown in FIG. 6 may be implemented by using a program that is run in a processor, or may be implemented by using a specific logic circuit.

Figure 7:
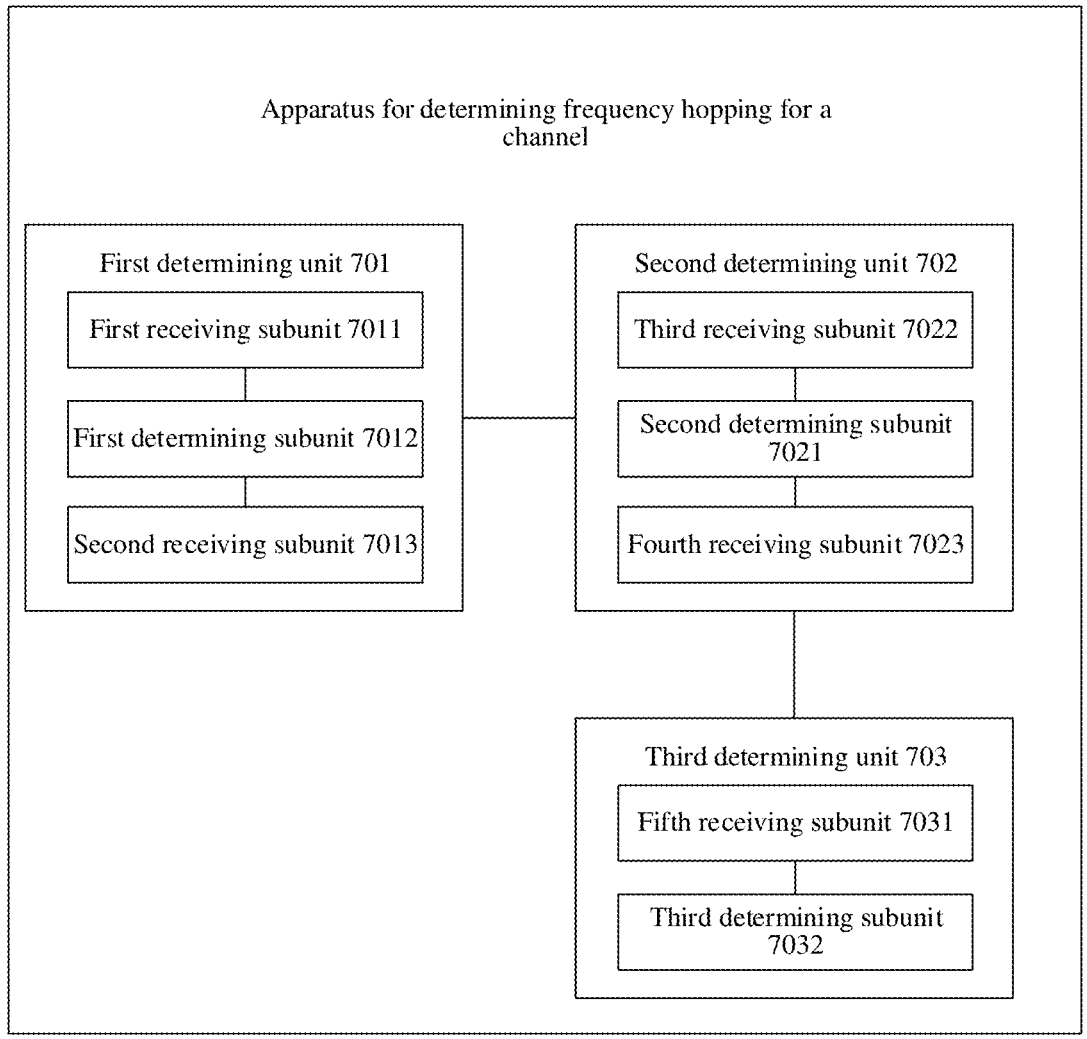
FIG. 7 is a schematic structural composition diagram 2 of an apparatus for determining frequency hopping for a channel according to an embodiment of this application.

FIG. 7 is a schematic structural composition diagram 2 of an apparatus for determining frequency hopping for a channel according to an embodiment of this application. As shown in FIG. 7, the apparatus for determining frequency hopping for a channel includes: a first determining unit 701, configured to determine a first bandwidth size corresponding to a bandwidth part, where the first bandwidth size corresponding to the bandwidth part is less than or equal to a bandwidth size of a carrier; a second determining unit 702, configured to determine, based on the first bandwidth size corresponding to the bandwidth part, a frequency hopping step-size corresponding to an uplink channel; and a third determining unit 703, configured to determine, based on the frequency hopping step-size corresponding to the uplink channel, a frequency domain position used for transmitting the uplink channel.

In an embodiment of this application, the first determining unit 701 includes: a first receiving subunit 7011, configured to receive first configuration information; and a first determining subunit 7012, configured to determine, based on the first configuration information, the first bandwidth size corresponding to the bandwidth part.

In an embodiment of this application, the first receiving subunit 7011 is specifically configured to receive RRC signaling that carries the first configuration information; or receive system information that carries the first configuration information.

In an embodiment of this application, the first determining subunit 7012 is specifically configured to: determine, based on one piece of first configuration information when the one piece of first configuration information is received, the first bandwidth size corresponding to the bandwidth part; determine, based on a plurality of pieces of first configuration information when the plurality of pieces of first configuration information is received, a plurality of candidate first bandwidth sizes corresponding to the bandwidth part; and select, from the plurality of candidate first bandwidth sizes, a first bandwidth size corresponding to the bandwidth part.

In an embodiment of this application, the first determining unit 701 further includes: a second receiving subunit 7013, configured to receive first control signaling; and the first determining subunit 7012 is further configured to select, from the plurality of candidate first bandwidth sizes based on the first control signaling, the first bandwidth size corresponding to the bandwidth part.

In an embodiment of this application, the first control signaling is: DCI or a MAC CE.

In an embodiment of this application, the second determining unit 702 is specifically configured to determine, based on the following formula, the frequency hopping step-size corresponding to an uplink channel: $W_H=nW$, where $W_H$ is the frequency hopping step-size corresponding to the uplink channel, W is the first bandwidth size corresponding to the bandwidth part, n is a scale factor, n=1/m, and m is a positive integer greater than 1.

In an implementation, m=2 or 4.

In an embodiment of this application, when $W_H$ is determined based on the formula $W_H=nW$, $W_H=\lceil nW \rceil$ or $\lfloor nW \rfloor$, where $\lceil nW \rceil$ represents a minimum integer greater than nW, and $\lfloor nW \rfloor$ represents a maximum integer less than nW.

Considering that the frequency hopping step-size has an actual meaning only when being equal to an integer multiple of a frequency domain scheduling unit, in this embodiment of this application, a value of $W_H$ is an integer.

In an embodiment of this application, the second determining unit 702 includes: a second determining subunit 7021, configured to determine n or $W_H$ based on a preset value; or a third receiving subunit 7022, configured to receive second configuration information; and a second determining subunit 7021, configured to determine n or $W_H$ based on the second configuration information.

In an embodiment of this application, the third receiving subunit 7022 is specifically configured to receive RRC signaling that carries the second configuration information; or receive system information that carries the second configuration information.

In an embodiment of this application, the second configuration information and the first configuration information are same configuration information.

In an embodiment of this application, the second determining subunit 7021 is specifically configured to: determine n or $W_H$ based on one piece of second configuration information when the one piece of second configuration information is received; determine a plurality of candidate n or $W_H$ based on a plurality of pieces of second configuration information when the plurality of pieces of second configuration information is received; and select n or $W_H$ from the plurality of candidate n or $W_H$.

In an embodiment of this application, the second determining unit 702 further includes: a fourth receiving subunit 7023, configured to receive second control signaling; and the second determining subunit 7021 is further configured to select n or $W_H$ from the plurality of candidate n or $W_H$ based on the second control signaling.

In an embodiment of this application, the second control signaling is: DCI or a MAC CE.

In an embodiment of this application, the second control signaling and the first control signaling are same control signaling.

In an embodiment of this application, the third determining unit 703 is specifically configured to determine a frequency domain position of the second step of frequency hopping based on a frequency domain position of the first step of frequency hopping and the frequency hopping step-size corresponding to the uplink channel, where the frequency domain position of the first step of frequency hopping and the frequency domain position of the second step of frequency hopping are frequency domain positions used for transmitting the uplink channel.

In an embodiment of this application, the third determining unit 703 includes: a fifth receiving subunit 7031, configured to receive third control signaling; and a third determining subunit 7032, configured to determine the frequency domain position of the first step of frequency hopping based on the third control signaling.

In an embodiment of this application, the third control signaling is: DCI or a MAC CE.

In an embodiment of this application, the third control signaling and at least one of the following are same control signaling: the first control signaling and the second control signaling.

Persons skilled in the art should understand that, functions implemented by units in the apparatus for determining frequency hopping for a channel shown in FIG. 7 may be understood by referring to the related description of the foregoing method for determining frequency hopping for a channel. The functions of the units in the apparatus for determining frequency hopping for a channel shown in FIG. 7 may be implemented by using a program that is run in a processor, or may be implemented by using a specific logic circuit.

If the foregoing apparatus for determining frequency hopping for a channel in the embodiments of this application is implemented in the form of a software function module and sold or used as an independent product, the apparatus for determining frequency hopping for a channel may be stored in a computer readable storage medium. Based on such an understanding, the technical solutions of the embodiments of this application essentially, or the part contributing to the existing technology may be reflected in a form of a software product. The computer software product is stored in a storage medium and includes several instructions for instructing a computer device (which may be a personal computer, a server, a network device, or the like) to perform all or a part of the methods of various embodiments of this application. The foregoing storage medium includes: any medium that can store program code, such as a USB flash drive, a removable hard disk, a read-only memory (ROM, Read-Only Memory), a magnetic disk, or a compact disc. In this way, the embodiments of this application are not limited by any combination of specific hardware and software.

Correspondingly, an embodiment of this application further provides a computer storage medium, storing a computer executable instruction. The computer executable instruction is executed by a processor to implement the foregoing method for determining frequency hopping for a channel in the embodiments of this application.

Figure 8:
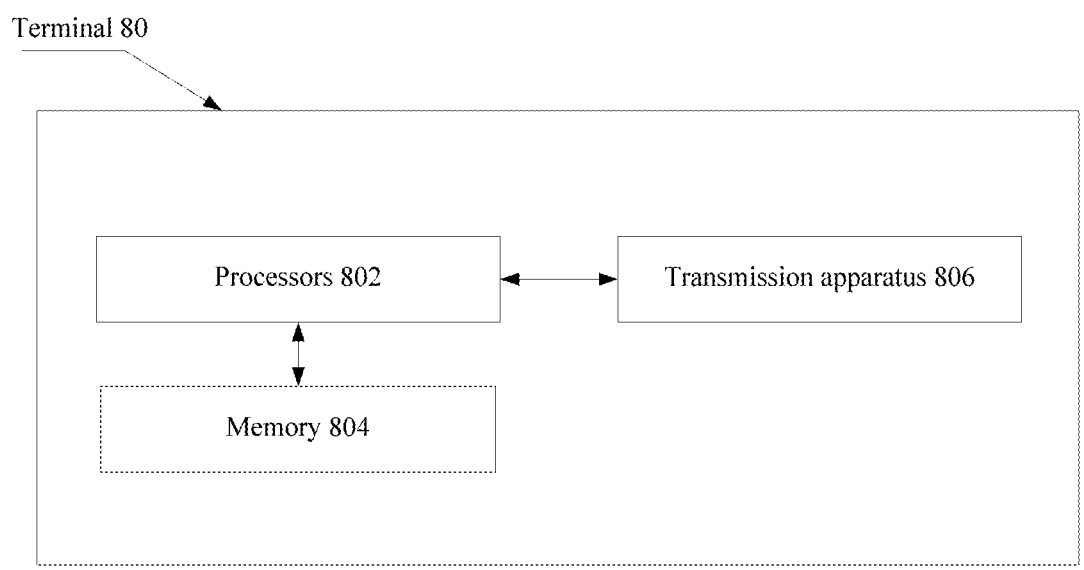
FIG. 8 is a schematic structural composition diagram of a terminal according to an embodiment of this application.

FIG. 8 is a schematic structural composition diagram of a terminal according to an embodiment of this application. As shown in FIG. 8, the terminal 80 may include one or more (where only one is shown in the figure) processors 802 (where the processors 802 may include but is not limited to processing apparatuses such as a micro control unit (MCU, Micro Control Unit) and a field programmable gate array (FPGA, Field Programmable Gate Array)), a memory 804 configured to store data, and a transmission apparatus 806 used for a communications function. Persons skilled in the art may understand that, the structure shown in FIG. 8 is only schematic, and the structure does not constitute a limitation to the structure of the foregoing electronic apparatus. For example, the terminal 80 may further include more or fewer components than those shown in FIG. 8, or have a configuration different from that shown in FIG. 8.

The memory 804 may be configured to store a software program and a module of application software, for example, a program instruction/module corresponding to method for determining frequency hopping for a channel in the embodiments of this application, and the processor 802 runs the software program and the module stored in the memory 804, to execute various function applications and data processing, that is, implement the foregoing method. The memory 804 may include a high-speed random memory, and may also include a nonvolatile memory such as one or more magnetic storage apparatuses, a flash memory, or another nonvolatile solid-state memory. In some embodiments, the memory 804 may further include memories remotely disposed relative to the processor 802, and these remote memories may be connected to the terminal 80 through a network. Examples of the network include, but are not limited to, the Internet, an intranet, a local area network, a mobile communications network, and a combination thereof.

The transmission apparatus 806 is configured to receive or send data through a network. A specific example of the network may include a wireless network provided by a communications operator of the terminal 80. In an example, the transmission apparatus 806 includes a network interface controller (NIC, Network Interface Controller) that may be connected to another network device by using a base station, thereby communicating with the Internet. In an example, the transmission apparatus 806 may be a radio frequency (RF, Radio Frequency) module that is configured to communicate with the Internet in a wireless manner.

Technical solutions set forth in the embodiments of this application may be in any combination when there is no conflict.

In the several embodiments provided in this application, it should be understood that the disclosed method and intelligent device may be implemented in other manners. The described device embodiments are merely exemplary. For example, the unit division is merely logical function division and may be other division during actual implementation. For example, a plurality of units or components may be merged or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to many network units. Some or all of the units need to be selected according to actual requirements to implement the purpose of the solution of the embodiments.

In addition, functional units in the embodiments of this application may be all integrated in a second processing unit, each unit is separately used as a unit, or two or more units are integrated in a unit. The integrated unit may be implemented in a form of hardware, or may be implemented in form of hardware plus a software functional unit.

The descriptions are only specific implementations of this application, but are not intended to limit the protection scope of this application. Any variation or replacement readily figured out by persons skilled in the art within the technical scope disclosed in this application shall fall within the protection scope of this application.

The invention claimed is:

1. A method for determining frequency hopping for a channel, the method comprising:

determining, by a terminal, a first bandwidth size corresponding to a bandwidth part, wherein the first bandwidth size corresponding to the bandwidth part is less than or equal to a bandwidth size of a carrier;

determining, by the terminal based on the first bandwidth size corresponding to the bandwidth part, a frequency hopping step-size corresponding to an uplink channel; and determining, by the terminal based on the frequency hopping step-size corresponding to the uplink channel, a frequency domain position used for transmitting the uplink channel, wherein determining, by the terminal based on the first bandwidth size corresponding to the bandwidth part, the frequency hopping step-size corresponding to the uplink channel comprises:

determining, by the terminal based on the following formula, the frequency hopping step-size corresponding to the uplink channel: $W_H = nW$, wherein $W_H$ is the frequency hopping step-size corresponding to the uplink channel, $W$ is the first bandwidth size corresponding to the bandwidth part, $n$ is a scale factor, $n=1/m$, and $m$ is a positive integer greater than 1, wherein $m=2$ or 4, wherein determining, by the terminal, the first bandwidth size corresponding to the bandwidth part comprises:

receiving, by the terminal, first configuration information, and determining, based on the first configuration information, the first bandwidth size corresponding to the bandwidth part, wherein determining, by the terminal based on the frequency hopping step-size corresponding to the uplink channel, the frequency domain position used for transmitting the uplink channel comprises:

determining, by the terminal, a frequency domain position of a second step of frequency hopping based on a frequency domain position of a first step of frequency hopping and the frequency hopping step-size corresponding to the uplink channel, wherein the frequency domain position of the first step of frequency hopping and the frequency domain position of the second step of frequency hopping are frequency domain positions used for transmitting the uplink channel.

2. The method for determining frequency hopping for a channel of claim 1, wherein the method further comprises:

receiving, by the terminal, third control signaling, and determining the frequency domain position of the first step of frequency hopping based on the third control signaling.

3. The method for determining frequency hopping for a channel of claim 2, wherein the third control signaling is: downlink control information (DCI) or a media access control element (MAC) control element (CE).

4. The method for determining frequency hopping for a channel of claim 1, wherein receiving, by the terminal, the first configuration information comprises:

receiving, by the terminal, radio resource control (RRC) signaling that carries the first configuration information; or receiving, by the terminal, system information that carries the first configuration information.

5. The method for determining frequency hopping for a channel of claim 1, wherein receiving, by the terminal, the first configuration information, and determining, based on the first configuration information, the first bandwidth size corresponding to the bandwidth part comprises:

determining, by the terminal based on one piece of first configuration information when receiving the one piece of first configuration information, the first bandwidth size corresponding to the bandwidth part; and determining, by the terminal based on a plurality of pieces of first configuration information when receiving the plurality of pieces of first configuration information, a plurality of candidate first bandwidth sizes corresponding to the bandwidth part; and selecting, from the plurality of candidate first bandwidth sizes, the first bandwidth size corresponding to the bandwidth part.

6. The method for determining frequency hopping for a channel of claim 5, wherein selecting, from the plurality of candidate first bandwidth sizes, the first bandwidth size corresponding to the bandwidth part comprises:

receiving, by the terminal, first control signaling; and selecting, from the plurality of candidate first bandwidth sizes based on the first control signaling, the first bandwidth size corresponding to the bandwidth part.

7. The method for determining frequency hopping for a channel of claim 1, wherein $W_H$ is determined based on the formula $W_H=nW$, $W_H=\lceil nW \rceil$ or $\lfloor nW \rfloor$, wherein $\lceil nW \rceil$ represents a minimum integer greater than nW, and $\lfloor nW \rfloor$ represents a maximum integer less than nW.

8. An apparatus for determining frequency hopping for a channel, the apparatus comprising:

one or more processors; and one or more memories, configured to store computer-readable instructions executable by the one or more processors, wherein the one or more processors are configured to:

determine a first bandwidth size corresponding to a bandwidth part, wherein the first bandwidth size corresponding to the bandwidth part is less than or equal to a bandwidth size of a carrier;

determine, based on the first bandwidth size corresponding to the bandwidth part, a frequency hopping step-size corresponding to an uplink channel; and determine, based on the frequency hopping step-size corresponding to the uplink channel, a frequency domain position used for transmitting the uplink channel, wherein determining, based on the first bandwidth size corresponding to the bandwidth part, the frequency hopping step-size corresponding to the uplink channel comprises:

determining, based on the following formula, the frequency hopping step-size corresponding to the uplink channel: $W_H=nW$, wherein $W_H$ is the frequency hopping step-size corresponding to the uplink channel, W is the first bandwidth size corresponding to the bandwidth part, n is a scale factor, n=1/m, and m is a positive integer greater than 1, wherein m=2 or 4, wherein determining the first bandwidth size corresponding to the bandwidth part comprises:

receiving first configuration information, and determining, based on the first configuration information, the first bandwidth size corresponding to the bandwidth part, wherein determining, based on the frequency hopping step-size corresponding to the uplink channel, the frequency domain position used for transmitting the uplink channel comprises:

determining a frequency domain position of a second step of frequency hopping based on a frequency domain position of a first step of frequency hopping and the frequency hopping step-size corresponding to the uplink channel, wherein the frequency domain position of the first step of frequency hopping and the frequency domain position of the second step of frequency hopping are frequency domain positions used for transmitting the uplink channel.

9. The apparatus for determining frequency hopping for a channel of claim 8, wherein the one or more processors are further configured to:

receive third control signaling; and determine the frequency domain position of the first step of frequency hopping based on the third control signaling.

10. The apparatus for determining frequency hopping for a channel of claim 9, wherein the third control signaling is: downlink control information (DCI) or a media access control (MAC) control element (CE).

11. The apparatus for determining frequency hopping for a channel of claim 8, wherein receiving the first configuration information comprises:

receiving radio resource control (RRC) signaling that carries the first configuration information; or receiving system information that carries the first configuration information.

12. The apparatus for determining frequency hopping for a channel of claim 8, wherein the one or more processors are specifically configured to:

determine, based on one piece of first configuration information when the one piece of first configuration information is received, the first bandwidth size corresponding to the bandwidth part;

determine, based on a plurality of pieces of first configuration information when the plurality of pieces of first configuration information is received, a plurality of candidate first bandwidth sizes corresponding to the bandwidth part; and select, from the plurality of candidate first bandwidth sizes, a first bandwidth size corresponding to the bandwidth part.

13. The apparatus for determining frequency hopping for a channel of claim 12, wherein the one or more processors are configured to:

receive first control signaling, and select, from the plurality of candidate first bandwidth sizes based on the first control signaling, the first bandwidth size corresponding to the bandwidth part.

14. The apparatus for determining frequency hopping for a channel of claim 8 wherein $W_H$ is determined based on the formula $W_H=nW$, $WH=\lceil nW \rceil$ or $\lfloor nW \rfloor$, wherein $\lceil nW \rceil$ represents a minimum integer greater than nW, and $\lfloor nW \rfloor$ represents a maximum integer less than nW.

15. A non-transitory computer-readable storage medium, comprising a computer executable instruction that, when being executed by one or more processors of a terminal, causes the terminal to implement operations, the operations comprising:

determining a first bandwidth size corresponding to a bandwidth part, wherein the first bandwidth size corresponding to the bandwidth part is less than or equal to a bandwidth size of a carrier;

determining, based on the first bandwidth size corresponding to the bandwidth part, a frequency hopping step-size corresponding to an uplink channel; and determining, based on the frequency hopping step-size corresponding to the uplink channel, a frequency domain position used for transmitting the uplink channel, wherein the operation of determining, based on the first bandwidth size corresponding to the bandwidth part, the frequency hopping step-size corresponding to the uplink channel comprises:
  determining, based on the following formula, the frequency hopping step-size corresponding to the uplink channel: $W_H = nW$, wherein $W_H$ is the frequency hopping step-size corresponding to the uplink channel, W is the first bandwidth size corresponding to the bandwidth part, n is a scale factor, n=1/m, and m is a positive integer greater than 1, wherein m=2 or 4,
wherein the operation of determining the first bandwidth size corresponding to the bandwidth part comprises:
  receiving first configuration information, and determining, based on the first configuration information, the first bandwidth size corresponding to the bandwidth part,
wherein the operation of determining, based on the frequency hopping step-size corresponding to the uplink channel, the frequency domain position used for transmitting the uplink channel comprises:
  determining a frequency domain position of a second step of frequency hopping based on a frequency domain position of a first step of frequency hopping and the frequency hopping step-size corresponding to the uplink channel, wherein the frequency domain position of the first step of frequency hopping and the frequency domain position of the second step of frequency hopping are frequency domain positions used for transmitting the uplink channel.

16. The non-transitory computer-readable storage medium of claim 15, wherein the operations further comprise:
  receiving third control signaling, and determining the frequency domain position of the first step of frequency hopping based on the third control signaling.

17. The non-transitory computer-readable storage medium of claim 16, wherein the third control signaling is: downlink control information (DCI) or a media access control element (MAC) control element (CE).

18. The non-transitory computer-readable storage medium of claim 15, wherein the operation of receiving the first configuration information comprises:
  receiving radio resource control (RRC) signaling that carries the first configuration information; or
  receiving system information that carries the first configuration information.

19. The non-transitory computer-readable storage medium of claim 15, wherein the operation of receiving the first configuration information, and determining, based on the first configuration information, the first bandwidth size corresponding to the bandwidth part comprises:
  determining, based on one piece of first configuration information when receiving the one piece of first configuration information, the first bandwidth size corresponding to the bandwidth part; and
  determining, based on a plurality of pieces of first configuration information when receiving the plurality of pieces of first configuration information, a plurality of candidate first bandwidth sizes corresponding to the bandwidth part; and
  selecting, from the plurality of candidate first bandwidth sizes, the first bandwidth size corresponding to the bandwidth part.

20. The non-transitory computer-readable storage medium of claim 19, wherein the operation of selecting, from the plurality of candidate first bandwidth sizes, the first bandwidth size corresponding to the bandwidth part comprises:
  receiving first control signaling; and
  selecting, from the plurality of candidate first bandwidth sizes based on the first control signaling, the first bandwidth size corresponding to the bandwidth part.

* * * * *